(12) United States Patent
Sato

(10) Patent No.: US 8,351,864 B2
(45) Date of Patent: Jan. 8, 2013

(54) WIRELESS TERMINAL AND RETRANSMISSION METHOD

(75) Inventor: Mitsuru Sato, Kanagawa (JP)

(73) Assignee: Panasonic Corporation, Osaka (JP)

( * ) Notice: Subject to any disclaimer, the term of this patent is extended or adjusted under 35 U.S.C. 154(b) by 281 days.

(21) Appl. No.: 12/933,343

(22) PCT Filed: Dec. 8, 2008

(86) PCT No.: PCT/JP2008/003651
§ 371 (c)(1),
(2), (4) Date: Sep. 17, 2010

(87) PCT Pub. No.: WO2009/116120
PCT Pub. Date: Sep. 24, 2009

(65) Prior Publication Data
US 2011/0039507 A1    Feb. 17, 2011

(30) Foreign Application Priority Data

Mar. 21, 2008  (JP) ................. 2008-074340

(51) Int. Cl.
*H04B 17/00* (2006.01)
*G08C 25/00* (2006.01)
*H04L 1/18* (2006.01)
(52) U.S. Cl. ............... 455/67.13; 455/226.2; 455/226.3; 714/748
(58) Field of Classification Search ............... 455/67.11, 455/67.13, 500, 63.1, 226.1, 226.2, 226.3; 714/746, 748, 749
See application file for complete search history.

(56) References Cited

U.S. PATENT DOCUMENTS

| | | | |
|---|---|---|---|
| 2002/0038441 A1* | 3/2002 | Eguchi et al. | 714/748 |
| 2003/0133457 A1 | 7/2003 | Ono | |
| 2004/0025184 A1* | 2/2004 | Hakenberg et al. | 725/90 |
| 2006/0013189 A1 | 1/2006 | Fujimoto | |
| 2008/0095058 A1 | 4/2008 | Dalmases | |

FOREIGN PATENT DOCUMENTS

| | | |
|---|---|---|
| JP | 2000-049663 | 2/2000 |
| JP | 2003-051781 | 2/2003 |
| JP | 2003-209887 | 7/2003 |
| JP | 2004-088154 | 3/2004 |
| JP | 2006-054853 | 2/2006 |

(Continued)

OTHER PUBLICATIONS

International Search Report dated Jan. 6, 2009.

(Continued)

*Primary Examiner* — Nguyen Vo
(74) *Attorney, Agent, or Firm* — Dickinson Wright PLLC

(57) ABSTRACT

A wireless terminal capable of securing the number of station units capable of simultaneous communication with one unit of access point, reducing power consumption, and ensuring stable communication quality. In the wireless terminal (100), an interference determining section (109) determines whether or not an interference wave is at a predetermined level or more on the basis of the RSSI and SNR of the received signals which are calculated by an RSSI (Received Signal Strength Indicator) calculating section (104) and SNR (Signal to Noise Ratio) calculating section (105) and the presence/absence of a demodulation error notified from a demodulation section (108). A number-of-retransmission upper limit setting section (113) sets the upper limit of the number of retransmission smaller than when the interference wave is at the predetermined level or lower if the interference wave is at the predetermined level or more. A WLAN transmitting circuit (115) repeats the transmission of a transmitting signal by the upper limit number of retransmission till the transmission of the transmitting signal is successful.

3 Claims, 5 Drawing Sheets

FOREIGN PATENT DOCUMENTS

| | | |
|---|---|---|
| JP | 2007-180754 | 7/2007 |
| JP | 2008-506292 | 2/2008 |

OTHER PUBLICATIONS

Notice of the Reasons for Rejection dated Aug. 7, 2012, in the corresponding Japanese Patent Application, with partial English translation.

Daichi Furusaka, et al., "Cell Control System for Wireless Local Area Network," Information Processing Society of Japan Research Report, Information Processing Society of Japan, May 7, 1999, vol. 99, No. 32, pp. 35-40 (Society in Japan, Report 2001-00248-006), with partial English translation.

Notice of the Reasons for Rejection dated Nov. 13, 2012.

* cited by examiner

| APPLICATION | TRANSMISSION RATE (Mpps) | RETRANSMISSION COUNT UPPER LIMIT VALUE |
|---|---|---|
| VoIP | 54 | 7 |
| | 11 | 3 |
| | 1 | 1 |
| TV TELEPHONE | A | RTV(A) |
| | B | RTV(B) |
| | C | RTV(C) |
| STREAMING (DATA TRANSFER) | A | RD(A) |
| | B | RD(B) |
| | C | RD(C) |

FIG.5

WIRELESS TERMINAL AND RETRANSMISSION METHOD

TECHNICAL FIELD

The present invention relates to a wireless terminal apparatus and retransmission method used in a wireless local area network ("WLAN").

BACKGROUND ART

At present, a transmission speed of 11 Mbps in IEEE 802.11b and a maximum transmission speed of 54 Mbps in IEEE 802.11a and IEEE 802.11g are defined for a wireless LAN ("WLAN"), and its supporting products are marketed. This allows a low-cost WLAN to become popular and increases the number of users to build a WLAN, thereby sharply increasing the popularity of a WLAN. Nowadays, a WLAN is used not only by companies for their services, but also by individual users for their home networks.

As a basic use method of a WLAN, there are two types of the infrastructure mode and ad hoc mode. With the former infrastructure mode, a WLAN connects by radio between an access point corresponding to a radio base station for portable telephones and a terminal (or station). With the latter ad hoc mode, a WLAN directly interconnects between a plurality of terminals without access points.

A WLAN uses an ISM (Industrial, Scientific and Medical) band, which needs not be licensed, and therefore transmission error frequently occurs. Even if narrowband transmission is performed, the WLAN is likely to be subject to the influence of noise and interference. Therefore, in the WLAN, it is necessary to take into account interference waves from, for example, a microwave oven or other radio transmitting devices. Also, if a terminal enters a dead point due to multipath fading in addition to noise, it is not possible to receive frames.

As a countermeasure for the above transmission error, IEEE 802.11 proposes a retransmission scheme with ACK's (ACKnowledgments). In the retransmission scheme with ACK's, the receiving side needs to return ACK's to all frames transmitted from the transmitting side. If all steps of returning ACK's to all of these frames success, operations are decided to have completed. Otherwise, the operations are decided to have failed. That is, if the transmitting source of data frames does not receive ACK's, the frames are decided to be lost. Regardless of whether the data frames are lost in the initial transmission or ACK's are lost upon transmission, if the transmitting source cannot receive the ACK's, the transmitting source retransmits the same data frames.

In a WLAN, while a predetermined station performs basic operations (described above) for one access point, communication is suppressed so that other stations do not interrupt the basic operations of the currently-used station, which prevents collisions.

The station side starting basic frame exchange, that is, the transmitting station, detects and corrects transmission error of data frames.

Transmission error has to be detected in the transmitting station. For example, the transmitting station decides error based on the fact that an ACK is not returned from the receiving station. Upon detecting error, the transmitting station retransmits a frame.

Also, the transmission station has a retransmission counter for counting the number of frame retransmissions, and increments the retransmission counter by one every time a frame is retransmitted. The retransmission counter is provided every frame or fragment. Also, the retransmission counter is classified into two types of the short frame retransmission counter and the long frame retransmission counter.

A WLAN secures reliability by retransmission. If a station that transmits a frame does not receive an ACK from an access point or the receiving station, the frame transmission is decided to have failed. When transmission fails, the retransmission counter is incremented by one. Further, when the number of retransmissions reaches a predetermined upper limit value, transmission of the frame is cancelled, which is reported to a higher layer of a protocol.

Patent Document 1: Japanese Patent Application Laid-Open Number 2004-88154

DISCLOSURE OF INVENTION

Problems to be Solved by the Invention

In a WLAN, it is possible to connect a plurality of stations with one access point. Especially in home networks, there is a demand for securing two or more stations at the same time, which can perform speech communication (in voice over internet protocol or "VoIP") with one access point. This is realized in a secure electrical field state.

However, if there are waveforms equal to or greater than a predetermined level from, for example, a microwave oven or other radio transmitting devices during communication between an access point and a station, the access point or the station cannot receive data frames. If the access point cannot receive a data frame transmitted from the station, the access point cannot return an ACK. Because an ACK is not returned from the access point, the station side retransmits the data frame transmitted earlier. Here, when transmission fails, the retransmission counter is incremented by one. Further, when the retransmission count reaches a predetermined upper limit value, transmission of the frame is cancelled, which is reported to a higher layer of a protocol.

Conventionally, the upper limit value of the number of retransmissions is fixed, and, consequently, the station side retransmits a data frame for a maximum number of times corresponding to the upper limit value before receiving an ACK. Thus, by retransmitting data frames, a band is occupied by communication between an access point and one predetermined station. For example, in an environment in which interference radio waves are present, if an access point and one predetermined station both perform retransmission, a speech communication band is occupied. As a result, it is not possible to secure the number of stations that can perform speech communication with the one access point at the same time. Especially, in speech communication of VoIP in which normal speech data frames are transmitted at 20 ms intervals, if a band is occupied, it is not possible to perform normal communication. Also, if the station and access point repeat retransmission, the power consumption upon transmission and reception in the station and access point increases.

It is therefore an object of the present invention to provide a radio terminal apparatus and retransmission method for securing the number of stations that can perform speech communication with an access point in a WLAN at the same time and reducing the power consumption of the access point and stations.

Means for Solving the Problem

The radio terminal apparatus of the present invention employs a configuration having: a receiving section that receives a received signal; a deciding section that decides whether or not there are interference waves equal to or above a predetermined level, using the received signal; a retransmission count upper limit value setting section that sets an upper limit value of a number of retransmissions lower when the deciding section decides that there are interference waves equal to or above the predetermined level than when the deciding section decides that there are interference waves below the predetermined level; and a transmitting section that repeats transmitting a transmission signal a same number of times as the upper limit value until the transmission signal is successfully transmitted.

The retransmission method of the present invention includes the steps of: receiving a received signal; deciding whether or not there are interference waves equal to or above a predetermined level, using the received signal; setting an upper limit value of a number of retransmissions lower when the deciding step decides that there are interference waves equal to or above the predetermined level than when the deciding step decides that there are interference waves below the predetermined level; and repeating transmitting a transmission signal a same number of times as the upper limit value until the transmission signal is successfully transmitted.

Advantageous Effect of Invention

According to the present invention, by setting the upper limit value of the number of retransmissions lower in the case where there are interference waves equal to or above a predetermined level in a WEAN than where there are interference waves below the predetermined level, it is possible to secure the number of stations that can perform speech communication with an access point in a WLAN at the same time, improve communication quality and reduce the power consumption of the access point and stations.

BRIEF DESCRIPTION OF DRAWINGS

FIG. 5 shows retransmission count upper limit values set based on transmission rates, according to an embodiment of the present invention.

BEST MODE FOR CARRYING OUT THE INVENTION

Now, embodiments of the present invention will be explained in detail with reference to the accompanying drawings.

Figure 1:
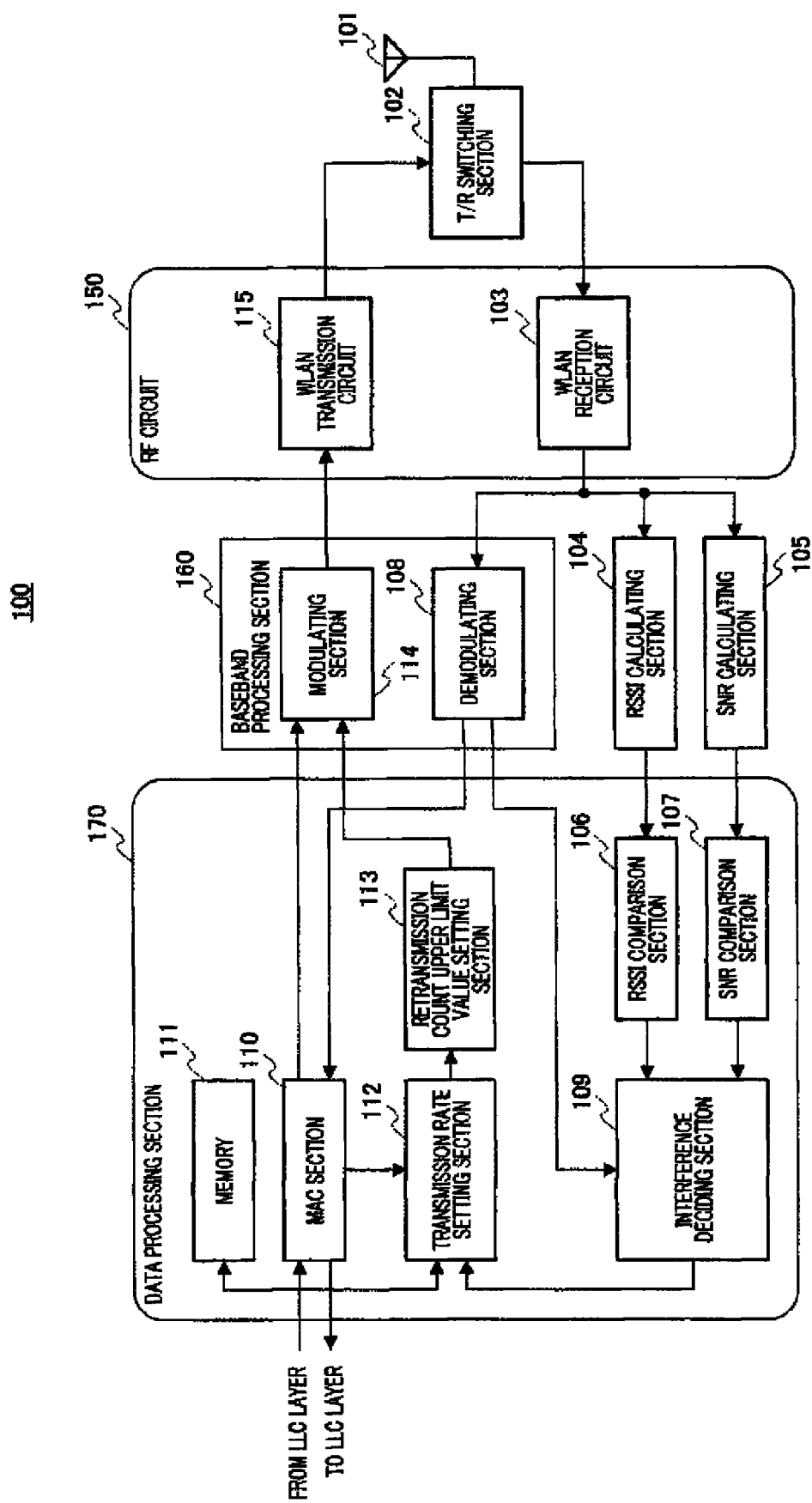
FIG. 1 is a block diagram showing the configuration of a radio terminal apparatus according to an embodiment of the present invention.

FIG. 1 is a block diagram showing the configuration of radio terminal apparatus (or station) 100 according to an embodiment of the present invention. Here, in FIG. 1, the configuration and operations related to the setting of retransmission count upper limit values, will be mainly explained.

In FIG. 1, radio terminal apparatus 100 is mainly provided with antenna 101, T/R (transmission/reception) switching section 102, WLAN reception circuit 103, RSSI (Received Signal Strength Indicator) calculating section 104, SNR (Signal to Noise Ratio) calculating section 105, RSSI comparison section 106, SNR comparison section 107, demodulating section 108, interference deciding section 109, MAC (Medium Access Control) section 110, memory 111, transmission rate setting section 112, retransmission count upper limit value setting section 113, modulating section 114 and WLAN transmission circuit 115. Here, WLAN reception circuit 103 and WLAN transmission circuit 115 form RF (Radio Frequency) circuit 150, demodulating section 108 and modulating section 114 form baseband processing section 160, RSSI comparison section 106, SNR comparison section 107, interference deciding section 109, MAC section 110, memory 111, transmission rate setting section 112 and retransmission count upper limit value setting section 113 form data processing section 170.

Antenna 101 receives a signal in a WLAN communication scheme and outputs the signal to WLAN reception circuit 103 via T/R switching section 102. Also, antenna 101 transmits a transmission signal in the WLAN communication scheme received as input from WLAN transmission circuit 115 via T/R switching section 102.

T/R switching section 102 switches between an output of the received signal received as input from antenna 101 to WLAN reception circuit 103 and an output of the transmission signal received as input from WLAN transmission circuit 115 to antenna 101.

WLAN reception circuit 103 down-converts the received signal received as input from T/R switching section 102, from radio frequency to baseband frequency, and outputs the result to RSSI calculating section 104, SNR calculating section 105 and demodulating section 108.

RSSI calculating section 104 calculates the RSSI of a beacon signal included in the baseband received signal received as input from WLAN reception circuit 103, and outputs the RRSI to RSSI comparison section 106.

SNR calculating section 105 calculates the SNR of the beacon signal included in the baseband received signal received as input from WLAN reception circuit 103, and outputs the SNR to SNR comparison section 107.

RSSI comparison section 106 compares the RSSI received as input from RSSI calculating section 104 and a predetermined threshold, and outputs the comparison result to interference deciding section 109.

SNR comparison section 107 compares the SNR received as input from SNR calculating section 105 and a predetermined threshold, and outputs the comparison result to interference deciding section 109.

Demodulating section 108 demodulates the baseband received signal received as input from WLAN reception circuit 103, outputs the resulting demodulation data to MAC section 110, and reports to interference deciding section 109 whether or not demodulation error occurs in the demodulation process.

Based on the RSSI comparison result received as input from RSSI comparison section 106, the SNR comparison result received as input from SNR comparison section 107 and the demodulation error report from demodulating section 108, interference deciding section 109 decides whether or not there are interference waves equal to or above a predetermined level against the WLAN from, for example, a microwave oven or other radio transmitting devices, and outputs the decision result to transmission rate setting section 112. Also, the interference wave level decision in interference deciding section 109 will be described later in detail.

MAC section 110 deletes control information such as a transmission destination MAC address and transmission source MAC address from the decoded data received as input from demodulating section 108, and passes the resulting received information to the LLC (Logical Link Control) layer. Also, MAC section 110 adds control information such as a communication destination MAC address and transmission source MAC address to transmission information given from the LLC layer of a higher layer, and outputs the result to modulating section 114. Also, MAC section 110 outputs "0" when transmission information outputted to modulating section 114 is initially transmitted, or outputs the retransmission count in the case of retransmission, to transmission rate setting section 112 and modulating section 114.

Transmission rate setting section 112 reads "0" received as input from MAC section 110 or a transmission rate corresponding to the number of transmissions, from memory 111. Also, upon receiving as input a decision result from interference deciding section 109 that there are interference waves below a predetermined level, transmission rate setting section 112 sets the transmission rate read from memory 111 as is as the transmission rate for transmission. In contrast, upon receiving as input a decision result from interference deciding section 109 that there are interference waves equal to or above a predetermined level, transmission rate setting section 112 sets the transmission rate for transmission lower than the transmission rate read from memory 111. Also, transmission rate setting section 112 outputs the transmission rate set for transmission to retransmission count upper limit value setting section 113.

Retransmission count upper limit value setting section 113 sets the retransmission count upper limit value according to the transmission rate received as input from transmission rate setting section 112, and outputs the set retransmission count upper limit value to modulating section 114. Here, the setting of the retransmission count upper limit value in retransmission count upper limit value setting section 113 will be described later in detail.

If "0" is received as input from MAC section 110 or the retransmission count received as input from MAC section 110 is equal to or below the retransmission count upper limit value received as input from retransmission count upper limit value setting section 113, modulating section 114 modulates the transmission information received as input from MAC section 110 and outputs the resulting transmission signal to WLAN transmission circuit 115.

WLAN transmission circuit 115 up-converts the transmission signal received as input from modulating section 114, from baseband frequency to radio frequency, and outputs the result to T/R switching section 102.

In home WLAN communication, it is necessary to connect a plurality of stations with one access point to secure stations that can perform communication at the same time.

Figure 2:
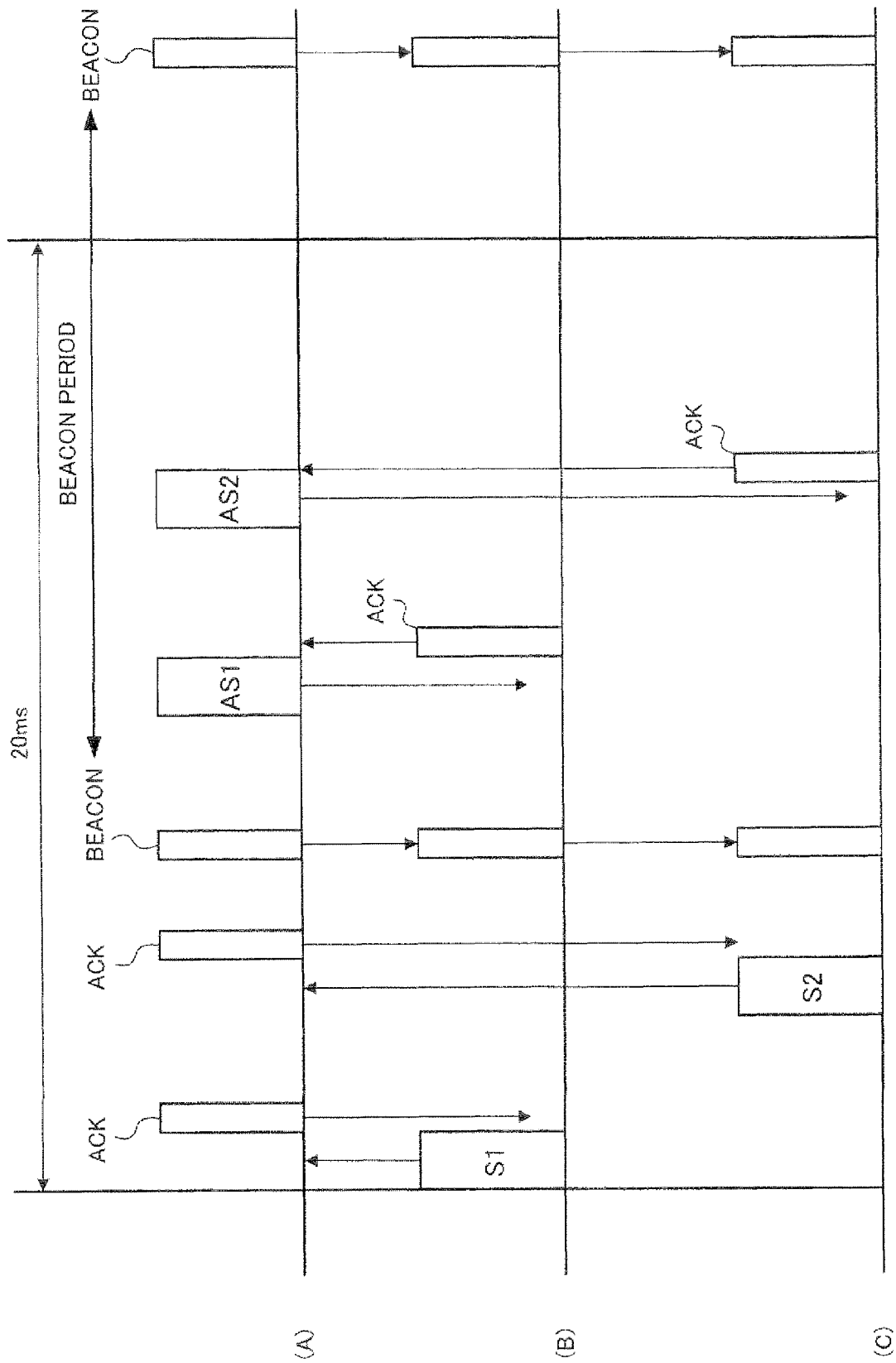
FIG. 2 illustrates communication operations between an access point and stations that perform VoIP communication in a WLAN in which there are interference waves below a predetermined level, according to an embodiment of the present invention.

FIG. 2 shows communication operations between an access point and stations that perform VoIP communication in a WLAN in which there are interference waves below a predetermined level. To be more specific, FIG. 2A shows the communication state of an access point, FIG. 2B shows the communication state of station 1, and FIG. 2C shows the communication state of station 2.

In VoIP, data is exchanged every 20 ms, and the following operations are performed in each 20-ms period. In a WLAN in which there are interference waves below a predetermined level, when communication packet data S1 is transmitted from station 1 to the access point, if the access point normally receives communication packet data S1, the access point transmits an ACK to station 1. Further, the access point transmits communication packet data AS1 to station 1. Upon receiving communication packet data AS1 normally, station 1 transmits an ACK to the access point. Also, the access point periodically transmits a beacon to each station. The above is a series of basic operations in communication between one access point and one station. FIG. 2 illustrates a state where station 1 and station 2 make a call to one access point at the same time. Here, the basic operations in communication between the access point and station 2 is the same as the basic operations in communication between the access point and station 1. Station 1 and station 2 each perform communication with the access point at 20-ms periods of VoIP communication time.

Figure 3:
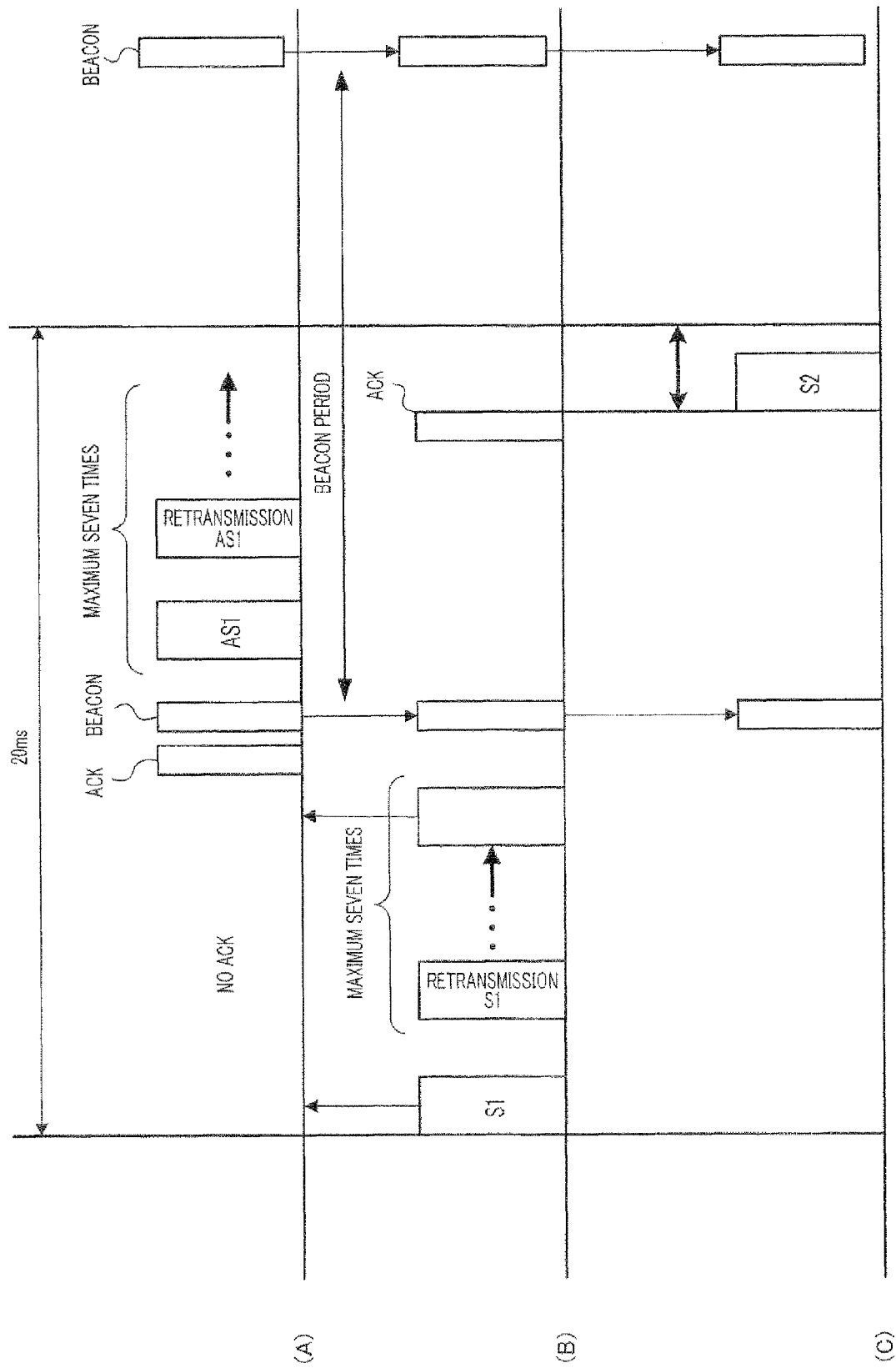
FIG. 3 illustrates operations between an access point and stations that perform VoIP communication in a WLAN in which there are interference waves equal to or above a predetermined level, according to an embodiment of the present invention.

FIG. 3 shows the operations between an access point and stations that perform VoIP communication in a WLAN in which there are interference waves equal to or above a predetermined level.

In a WLAN in which there are interference waves equal to or above a predetermined level, when communication packet data S1 is transmitted from station 1 to the access point, the access point cannot receive communication packet S1 normally, and therefore does not transmit an ACK to station 1. According to the basic operations in WLAN, station 1 retransmits communication packet S1 when station 1 cannot receive an ACK. Station 1 repeats retransmissions the same number of times as a retransmission count upper limit value set in advance before receiving an ACK. Therefore, if the above retransmission is performed in 20 ms of VoIP, a communication band is occupied for a long time by communication between station 1 and the access point. Also, a beacon is also transmitted at the time of retransmission, and, consequently, a wider band is occupied. That is, a band is not secured upon connection with station 2, and therefore communication is difficult between station 2 and the access point.

Next, the decision of an interference wave level and setting of a retransmission count upper limit value in radio terminal apparatus 100 having the above configuration, will be explained.

Figure 4:
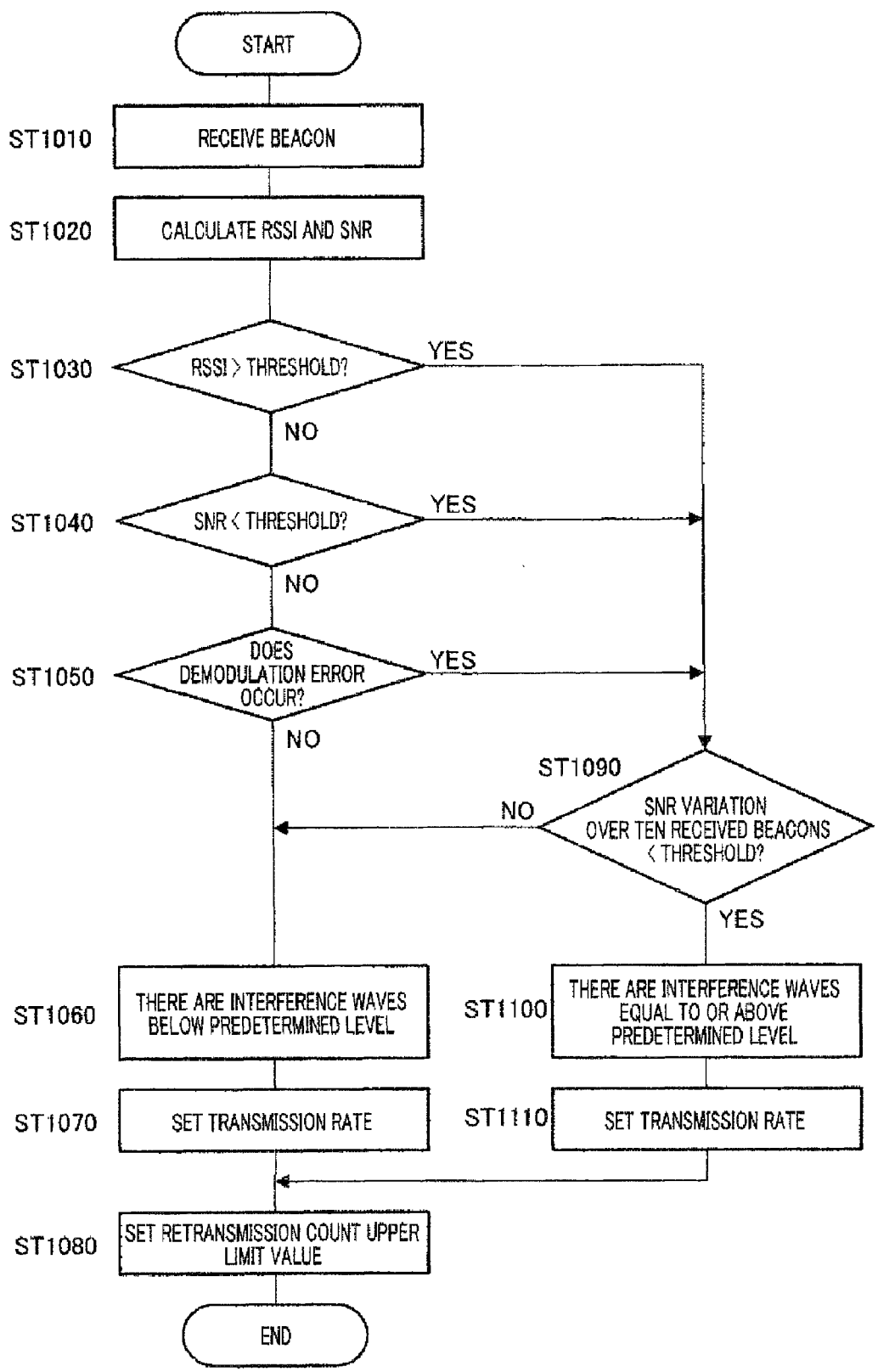
FIG. 4 is a flowchart showing the steps of deciding an interference wave level and setting a retransmission count upper limit value in a radio terminal apparatus according to an embodiment of the present invention.

FIG. 4 is a flowchart showing the steps of deciding the interference wave level and setting the retransmission count upper limit value in radio terminal apparatus 100.

First, radio terminal apparatus 100 receives a received signal including a beacon by antenna 101, T/R switching section 102 and WLAN reception circuit 103, and outputs the signal to RSSI calculating section 104 and SNR calculating section 105 (ST 1010).

Next, RSSI calculating section 104 and SNR calculating section 105 calculate the RSSI and SNR of the beacon included in the received signal received as input from WLAN reception circuit 103 (ST 1020).

Next, RSSI comparison section 106 compares the beacon RSSI and a predetermined threshold, and outputs the comparison result to interference deciding section 109 (ST 1030).

Next, SNR comparison section 107 compares the beacon SNR and a predetermined threshold, and outputs the comparison result to interference deciding section 109 (ST 1040).

Next, demodulating section 108 demodulates the received signal and reports to interference deciding section 109 whether or not demodulation error occurs (ST 1050).

Next, if the beacon RSSI is equal to or below the predetermined threshold ("NO" in ST 1030), the beacon SNR is equal to or above the predetermined threshold ("NO" in ST 1040) and demodulation error does not occur ("NO" in ST 1050), interference deciding section 109 decides that there are interference waves below a predetermined level (ST 1060).

Next, transmission rate setting section 112 reads "0" received as input from MAC section 110 or a transmission rate corresponding to the transmission count from memory 111, and sets the result as the transmission rate for transmission (ST 1070).

Next, retransmission count upper limit value setting section 113 sets a retransmission count upper limit value according to the transmission rate set in transmission rate setting section 112 (ST 1080).

In contrast, if the beacon RSSI is above the predetermined threshold ("YES" in ST 1030), the beacon SNR is below the predetermined threshold ("YES" in ST 1040) or demodulation error occurs ("YES" in ST 1050), interference deciding section 109 calculates the SNR variation over ten received beacons and compares the calculated variation with a predetermined threshold (ST 1090). Here, for example, methods of calculating the SNR variation over ten received beacons include calculating the SNR variation between every received beacon and the previously-received beacon, and comparing the ten calculated variations with a predetermined threshold.

Next, if a condition is not satisfied that the SNR variations over ten received beacons are each below the predetermined threshold ("NO" in ST 1090), the step in FIG. 4 proceeds to ST 1060.

In contrast, if the SNR variations over ten received beacons are each below the predetermined threshold ("YES" in ST 1090), interference deciding section 109 decides that the communication environment is still poor and there are interference waves equal to or above a predetermined level (ST 1100).

Next, transmission rate setting section 112 reads "0" received as input from MAC section 110 or a transmission rate corresponding to the transmission count from memory 111, and sets the transmission rate for transmission lower than the read transmission rate, and then the step proceeds to ST 1080 (ST 1110).

FIG. 5 shows retransmission count upper limit values set in retransmission count upper limit value setting section 113 according to transmission rates set in transmission rate setting section 112.

In FIG. 5, the first column shows the types of applications, the second column shows transmission rates and the third column shows retransmission count upper limit values. Also, RTV (A) to RTV (C) and RD(A) to RD (C) each represent a function with respect to A, B or C. As shown in FIG. 5, retransmission count upper limit value setting section 113 sets the retransmission count upper limit value according to a transmission rate set in transmission rate setting section 112, and sets the retransmission count upper limit value lower when the transmission rate decreases. Also, transmission rate setting section 112 sets the transmission rate lower when there are interference waves equal to or above a predetermined level than when there are interference waves below the predetermined level. Therefore, retransmission count upper limit value setting section 113 sets the retransmission count upper limit value lower when there are interference waves equal to or above a predetermined level than when there are interference waves below the predetermined level.

Thus, according to the present embodiment, a radio terminal apparatus decides whether or not there are interference waves equal to or above a predetermined level from, for example, a microwave oven or other radio transmitting devices in the WLAN communication environment, using received signals. Further, when there are interference waves equal to or above the predetermined level, the radio terminal apparatus sets the retransmission count upper limit value lower than when there are interference waves below the predetermined level, so that it is possible to secure stations that can perform communication with one access point at the same time. Also, by reducing the number of retransmissions by which communication quality is not improved, it is possible to reduce the power consumption of stations.

Also, although an example case has been described above with the present embodiment where the steps of ST 1030 to ST 1050 are performed in order, the present invention is not limited to this, and it is equally possible to change the order of the steps of ST 1030 to ST 1050 arbitrarily or perform these steps in parallel.

Also, an example case has been described above with the present embodiment where the transmission rate is set based on the retransmission count and interference wave level and where the retransmission count upper limit value is set based on the set transmission rate. However, the present invention is not limited to this, and it is equally possible to directly set the retransmission count upper limit value based on the interference wave level.

The disclosure of Japanese Patent Application No. 2008-074340, filed on Mar. 21, 2008, including the specification, drawings and abstract, is incorporated herein by reference in its entirety.

INDUSTRIAL APPLICABILITY

The radio terminal apparatus and retransmission method according to the present invention are applicable for use such as a radio terminal apparatus that can communicate with a cellular network and WLAN.

The invention claimed is:

1. A radio terminal apparatus comprising
a receiving section that receives a received signal;
a demodulating section that demodulates the received signal;
a calculating section that calculates an RSSI (Received Signal Strength Indicator) and SNR (Signal to Noise Ratio) of a beacon signal included in the received signal, and a variation of the SNR over several past receptions;
a deciding section that, when a demodulation error occurs and the variation of the SNR is below a threshold for variation, when the RSSI is above a threshold for RSSI and the variation of the SNR is below the threshold for variation, or when the SNR is below a threshold for SNR and the variation of the SNR is below the threshold for variation, decides that there are interference waves equal to or above the predetermined level, or otherwise, decides that there are interference waves below the predetermined level;
a retransmission count upper limit value setting section that sets an upper limit value of a number of retransmissions lower when the deciding section decides that there are interference waves equal to or above the predetermined level than when the deciding section decides that there are interference waves below the predetermined level; and
a transmitting section that repeats transmitting a transmission signal a same number of times as the upper limit value until the transmission signal is successfully transmitted.

2. The radio terminal apparatus according to claim 1, further comprising a transmission rate setting section that sets a transmission rate for transmitting the transmission signal lower when the deciding section decides that there are interference waves equal to or above the predetermined level than when the deciding section decides that there are interference waves below the predetermined level,
  wherein the retransmission count upper limit value setting section sets the upper limit value of the number of retransmissions, using a value according to the transmission rate set in the transmission rate setting section.

3. A retransmission method comprising the steps of:
receiving a received signal;
demodulating the received signal;
calculating an RSSI (Received Signal Strength Indicator) and SNR (Signal to Noise Ratio) of a beacon signal included in the received signal, and a variation of the SNR over several past receptions;
when a demodulation error occurs and the variation of the SNR is below a threshold for variation, when the RSSI is above a threshold for RSSI and the variation of the SNR is below the threshold for variation, or when the SNR is below a threshold for SNR and the variation of the SNR is below the threshold for variation, deciding that there are interference waves equal to or above the predetermined level, or otherwise, deciding that there are interference waves below the predetermined level;
setting an upper limit value of a number of retransmissions lower when the deciding step decides that there are interference waves equal to or above the predetermined level than when the deciding step decides that there are interference waves below the predetermined level; and
repeating transmitting a transmission signal a same number of times as the upper limit value until the transmission signal is successfully transmitted.

* * * * *